(12) United States Patent
Arisawa et al.

(10) Patent No.: US 8,991,557 B2
(45) Date of Patent: Mar. 31, 2015

(54) GEAR TRAIN LUBRICATING DEVICE

(75) Inventors: Hidenori Arisawa, Kakogawa (JP); Hideyuki Imai, Akashi (JP); Tatsuhiko Goi, Kobe (JP); Motohiko Nishimura, Matsudo (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 15 days.

(21) Appl. No.: 13/578,570

(22) PCT Filed: Dec. 6, 2010

(86) PCT No.: PCT/JP2010/007078
§ 371 (c)(1),
(2), (4) Date: Oct. 15, 2012

(87) PCT Pub. No.: WO2011/099105
PCT Pub. Date: Aug. 18, 2011

(65) Prior Publication Data
US 2013/0025405 A1    Jan. 31, 2013

(30) Foreign Application Priority Data

Feb. 10, 2010  (JP) .................................. 2010-027359

(51) Int. Cl.
*F16H 57/02* (2012.01)
*F02C 7/32* (2006.01)
(Continued)

(52) U.S. Cl.
CPC .............. *F02C 7/32* (2013.01); *F16H 57/0409* (2013.01); *F16H 57/0423* (2013.01); *F16H 57/0495* (2013.01); *F01D 25/18* (2013.01); *F05D 2260/4031* (2013.01); *Y02T 50/671* (2013.01)
USPC ...................................... 184/6.12; 74/606 R (58) Field of Classification Search
USPC ................................ 184/6.12, 109; 74/606 R
See application file for complete search history.

(56) References Cited

U.S. PATENT DOCUMENTS 2,277,270 A *  3/1942  Schmitter et al. ............... 418/32
3,788,426 A    1/1974  Hull, Jr.
(Continued)

FOREIGN PATENT DOCUMENTS

DE          29517964 U1    1/1996
DE       102008011937 A1    9/2009
(Continued)

OTHER PUBLICATIONS

European Patent Office, Extended European Search Report of EP10845710.2, Germany, Jun. 19, 2013, 3 pages.
(Continued)

*Primary Examiner* — William A Rivera
*Assistant Examiner* — Michael Riegelman
(74) *Attorney, Agent, or Firm* — Alleman Hall McCoy Russell & Tuttle LLP (57) ABSTRACT

A gear train lubricating device configured to supply lubricating oil OL to a gear included in a gear train is provided. The gear train lubricating device includes: a shroud covering, among components constituting the gear, at least teeth of the gear; and a lubricating oil supply port through which the lubricating oil OL is supplied to a meshing position of the gear. The shroud has an outlet port formed therein, through which the supplied lubricating oil OL is discharged. The outlet port is formed in a portion of the shroud that is positioned radially outward from the gear, such that the outlet port is disposed at an angular position that is 90°±15° forward from the meshing position in a rotation direction R1 of the gear.

7 Claims, 7 Drawing Sheets

(51) Int. Cl.
*F16H 57/04* (2010.01)
*F01D 25/18* (2006.01)

(56) References Cited

U.S. PATENT DOCUMENTS

| | | | | |
|---|---|---|---|---|
| 4,667,774 | A | * | 5/1987 | Roberge ................... 184/6.12 |
| 5,004,407 | A | * | 4/1991 | Hutchison ................... 418/1 |
| 7,963,186 | B2 | * | 6/2011 | Hayes et al. ................... 74/467 |
| 2010/0140019 | A1 | * | 6/2010 | Imai et al. ................... 184/6.12 |

FOREIGN PATENT DOCUMENTS

| | | |
|---|---|---|
| JP | 4830097 | 9/1973 |
| JP | 60176822 | 9/1985 |
| JP | 2008025832 | 2/2008 |
| WO | 9105965 | 5/1991 |

OTHER PUBLICATIONS

ISA Japan, International Search Report of PCT/JP2010/007078, Jan. 11, 2011, WIPO, 1 page.

\* cited by examiner

GEAR TRAIN LUBRICATING DEVICE

TECHNICAL FIELD

The present invention relates to a lubricating device for a gear train in a gear system such as a gearbox or a high-speed gear mechanism used in a gas turbine engine or a jet engine.

BACKGROUND ART

Such a gear system as mentioned above includes a lubricating oil supply port and a lubricating oil outlet port for use in lubricating and cooling down the gears. The lubricating oil supply port is used for spraying lubricating oil onto the gears, and the lubricating oil outlet port is used for collecting, with an oil scavenging pump, the lubricating oil that has been used for lubricating and cooling down the gears. Power loss in such a gear system is mainly caused by air resistance and lubricating oil agitation resistance, which occur when the gears rotate. Particularly in the case of an aircraft engine, the air resistance is great since the gear train rotates at a relatively high speed. Moreover, in aircrafts developed in recent years, electrification of various airframe facilities has been promoted rapidly. Therefore, in the near future, necessary electric power generation capacity is expected to increase greatly. In this case, power loss in a gear system that is caused by the air resistance and the lubricating oil agitation resistance also increases, which results in an increase in negative influence on the fuel consumption of an aircraft engine such as a jet engine or a gas turbine engine.

For the purpose of reducing the above-described power loss in a gear system, there is a proposed gear shrouding system (see Patent Literature 1) in which a plurality of gears meshing with each other in a gear train are covered by a shroud, so that generation of a swirling air flow of an inverted tornado type, which tends to be generated at the front face of each gear when air is dragged by the front face of each gear due to rotation of the gears, is suppressed and thereby the air resistance is reduced. The shroud includes: a pair of side walls disposed opposite the sides of each gear and adjacent to the outer diameter surface of each gear; and an end wall disposed perpendicular to the pair of side walls and being disposed parallel to the front face of each gear, such that the side walls and the end wall enclose the front face of each of the plurality of gears of the gear train. The end wall is provided with a first port for injecting lubricating oil onto the gears and a second port for discharging the lubricating oil from the shroud. The shrouding system is disposed in close proximity to the teeth of the gears, and thereby suppresses the generation of the above-described swirling air flow at the front face of each gear and reduces the air resistance.

CITATION LIST

Patent Literature

PTL 1: Japanese National Phase PCT Laid-Open Publication No. 4-503558

SUMMARY OF INVENTION

Technical Problem

The above-described shroud, which covers the gears of the gear train, needs to have a shape suitable for smoothly guiding the lubricating oil to the outlet port without causing stagnation of the lubricating oil and then efficiently discharging the lubricating oil through the outlet port so that the air resistance and the lubricating oil agitation resistance will be reduced effectively. If the outlet port is not suitably positioned in the shroud, an excessive amount of lubricating oil remains within the shroud. As a result, the installation of the shroud adversely causes an increase in power loss. However, the shroud disclosed in Patent Literature 1, which suppresses the generation of the above-described swirling air flow, does not take into consideration the smooth guiding of the lubricating oil to the outlet port and the efficient discharging of the lubricating oil through the outlet port.

An object of the present invention is to provide a gear train lubricating device capable of smoothly guiding lubricating oil to an outlet port and efficiently discharging the lubricating oil through the outlet port, thereby effectively reducing the air resistance and the lubricating oil agitation resistance in order to suppress power loss.

Solution to Problem

In order to achieve the aforementioned object, a gear train lubricating device according to the present invention, which is configured to supply lubricating oil to a gear included in a gear train, includes: a shroud covering, among components constituting the gear, at least teeth of the gear; and a lubricating oil supply port through which the lubricating oil is supplied to a meshing position of the gear. The shroud has an outlet port formed therein, through which the supplied lubricating oil is discharged. The outlet port is formed in a portion of the shroud that is positioned radially outward from the gear, such that the outlet port is disposed at an angular position that is $90°\pm15°$ forward from the meshing position in a rotation direction of the gear.

In the shroud, at the position that is $90°\pm15°$ forward in the rotation direction of the gear from the meshing position of the gear, the lubricating oil is sufficiently rectified, and at the position, the lubricating oil swirls at a suitable flow rate and great centrifugal force is exerted on the swirling lubricating oil. Thus, according to the above-described gear train lubricating device, the area of opening of the outlet port can be made small, which is advantageous in terms of suppressing air resistance, and yet the lubricating oil can be efficiently discharged through the outlet port. This makes it possible to reduce air resistance exerted on the gear, and to suppress an increase in lubricating oil agitation resistance, which increase is caused when an excessive amount of lubricating oil remains within the shroud. Specifically, if the outlet port formed in the shroud is disposed at a position that is forward in the rotation direction of the gear from the meshing position by an angle less than $90°\pm15°$, the lubricating oil is not sufficiently rectified. As a result, smooth discharge of the lubricating oil cannot be realized. On the other hand, if the outlet port is disposed at a position that is forward in the rotation direction of the gear from the meshing position by an angle greater than $90°\pm15°$, a time during which the lubricating oil remains within the shroud becomes long, which results in an increase in lubricating oil agitation resistance occurring when the gear agitates the remaining lubricating oil, and power loss increases, accordingly.

In the present invention, it is preferred that the outlet port has an angular width of $45°\pm7°$ with respect to a central axis of the gear. The outlet port having such an angular width allows a suitable amount of lubricating oil to be discharged efficiently, making it possible to reduce power loss. Specifically, if the angular width of the outlet port is less than $45°\pm7°$, the discharge amount of the lubricating oil becomes small. As a result, an excessive amount of lubricating oil remains within the shroud. On the other hand, if the angular width of the outlet port is greater than 45°±7°, the area of opening of the outlet port becomes too large, which increases a possibility that air, oil droplets, and the like flow in from the outside (i.e. from the surroundings). As a result, the reduction of power loss is hindered.

In the present invention, it is preferred that the shroud includes: an outer peripheral wall covering the gear from radially outward; and side walls connected to both side edges, respectively, of the outer peripheral wall and covering side faces of the teeth. According to this structure, the gear can be surrounded by the shroud which has a simple structure with a U-shaped cross section.

In the structure including the shroud which has side walls that are connected to both side edges, respectively, of the outer peripheral wall, it is preferred that the outlet port has a width in a direction of the central axis, the width being substantially equal to an internal gap between the side walls. According to this structure, the lubricating oil within the shroud receives centrifugal force occurring from the rotation of the gear, and flows while being guided mainly by the outer peripheral wall of the shroud. Thereafter, almost all of the lubricating oil is efficiently discharged through the outlet port, the width of which extends in the direction of the central axis. Thus, a possibility that the lubricating oil remains within the shroud is reduced.

In the structure including the shroud which has side walls that are connected to both side edges, respectively, of the outer peripheral wall, it is preferred that a gap between the outer peripheral wall of the shroud and tooth tips of the teeth is 0.5 to 1.5 times greater than a depth of the teeth. According to this structure, the agitation resistance of the lubricating oil is reduced. Specifically, if the gap, in a radial direction, between the outer peripheral wall of the shroud and the tooth tips of the gear is greater than the aforementioned range, then the amount of lubricating oil remaining between the outer peripheral wall and the tooth tips increases, resulting in an increase in lubricating oil agitation resistance. On the other hand, if the gap in the radial direction is less than the aforementioned range, the flow resistance of the lubricating oil at the gap in the radial direction between the gear and the shroud increases.

In the structure including the shroud which has side walls that are connected to both side edges, respectively, of the outer peripheral wall, it is preferred that a gap between each of the side walls and a side face opposed thereto of the teeth is 5±1 mm. This structure makes it possible to suppress generation of an air flow swirling around the central axis, which tends to be generated when air is dragged by the side faces of the gear. Consequently, air resistance exerted on the gear is reduced. If the gap is greater than the aforementioned range, the advantageous effect of reducing the air resistance is reduced. On the other hand, if the gap is less than the aforementioned range, the lubricating oil becomes more likely to adhere to the side faces of the gear, causing an increase in rotational resistance.

In the present invention, it is preferred that the lubricating oil supply port is positioned away from the meshing position in a direction opposite to the rotation direction of the gear, and is configured to supply the lubricating oil to the meshing position. According to this structure, if the gear train is assumed to act as a gear pump, the lubricating oil is supplied to the suction side of the gear pump. Thus, a large amount of lubricating oil can be efficiently supplied to the teeth of both gears.

In the present invention, a peripheral speed at a pitch circle of each of the pair of gears is set to 50 to 120 m/sec, for example. Outlet ports are formed in the outer peripheral wall of the shroud such that each outlet port is provided at a respective position that is away from the meshing position of the gears and that is 90°±15° forward from the meshing position in the rotation direction of a corresponding one of the gears. Therefore, advantageous effects of reducing both lubricating oil agitation resistance and air resistance exerted on the gears of the gear train, which rotates with such a high peripheral speed, can be sufficiently provided.

Advantageous Effects of Invention

Accordingly, in the gear train lubricating device of the present invention, the outlet port for the lubricating oil is formed in the outer peripheral wall of the shroud at a position that is 90°±15° forward in the rotation direction of the gear from the meshing position of the gear. In the shroud, at the position where the outlet port is formed, the lubricating oil that has sufficiently been rectified swirls at a suitable flow rate, and great centrifugal force in a discharging direction is exerted on the swirling lubricating oil. Such a suitably positioned outlet port is formed such that the area of opening of the outlet port is small, which is advantageous in terms of suppressing air resistance exerted on the gear, and yet the outlet port allows the lubricating oil to be efficiently discharged therethrough by a preset discharge amount. This makes it possible to reduce the air resistance exerted on the gear, and to suppress an increase in lubricating oil agitation resistance, the increase being caused when an excessive amount of lubricating oil remains within the shroud. As a result, power loss can be reduced.

DESCRIPTION OF EMBODIMENTS

Hereinafter, a preferred embodiment of the present invention is described with reference to the accompanying drawings.

Figure 1:
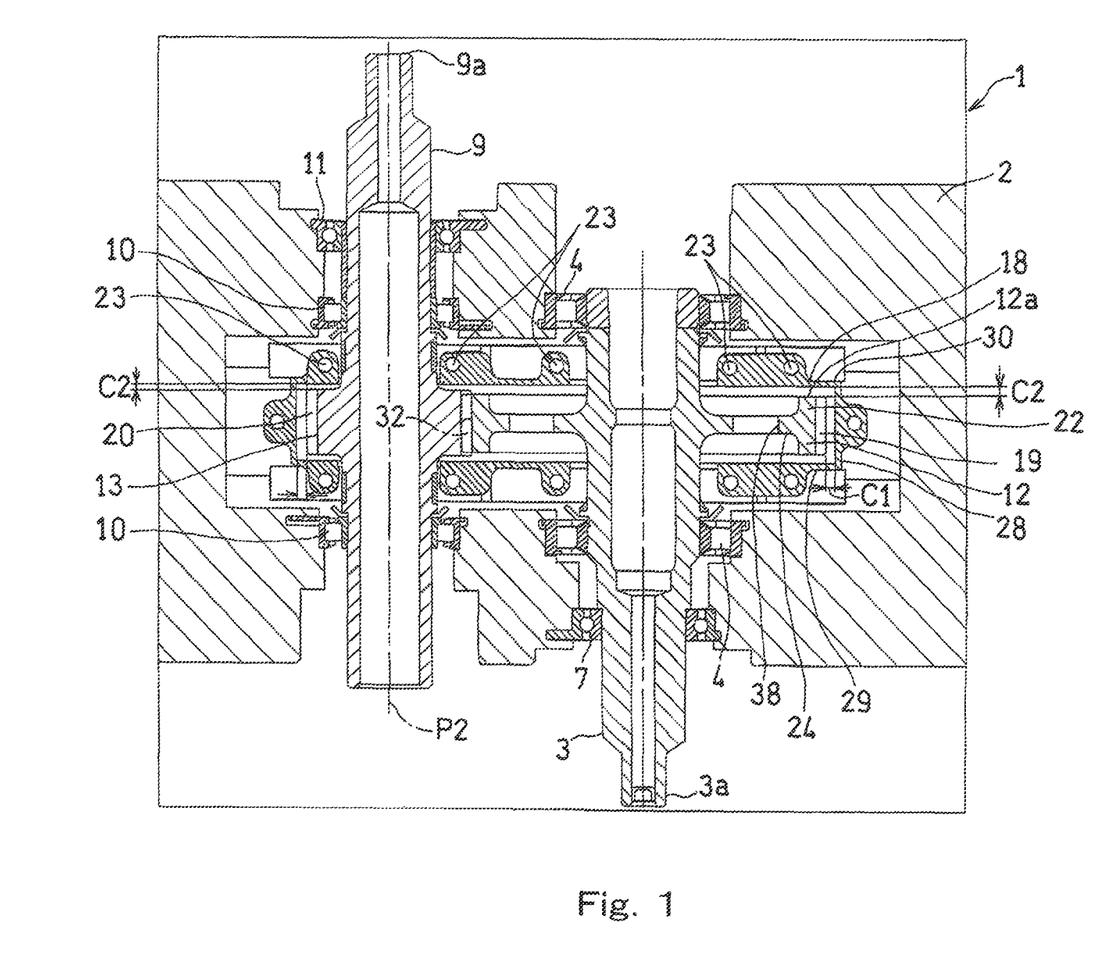
FIG. 1 is a horizontal sectional view showing a gear system including a gear train lubricating device according to an embodiment of the present invention.

FIG. 1 is a horizontal sectional view of a gear system according to an embodiment of the present invention. As shown in FIG. 1, a gear system 1 according to the present embodiment includes an input shaft 3 and an output shaft 9. The input shaft 3 is rotatably supported by a bearing housing 2 via three bearings which are two bearings 4 and a bearing 7. One end 3a of the input shaft 3 is connected to a jet engine or a different power source via a power transmission device which is not shown. An input gear 12, which is a spur gear, is integrally formed on the input shaft 3. A rim 22 is formed at the outer periphery of the input gear 12. The width of the rim 22 in an axial direction is greater than that of a disc 24 positioned at the inner side of the rim 22. Spur teeth 19 are formed at the outer diameter surface of the rim 22.

Meanwhile, the output shaft 9 is rotatably supported by the bearing housing 2 via three bearings which are two bearings 10 and a bearing 11. One end 9a of the output shaft 9 is connected to a power generator or an accessory device via a power transmission device which is not shown. An output gear 13, which is a spur gear, is integrally formed on the output shaft 9. Spur teeth 20 are formed at the outer diameter surface of the output gear 13. The input gear 12 and the output gear 13 are disposed such that they mesh with each other.

Figure 2:
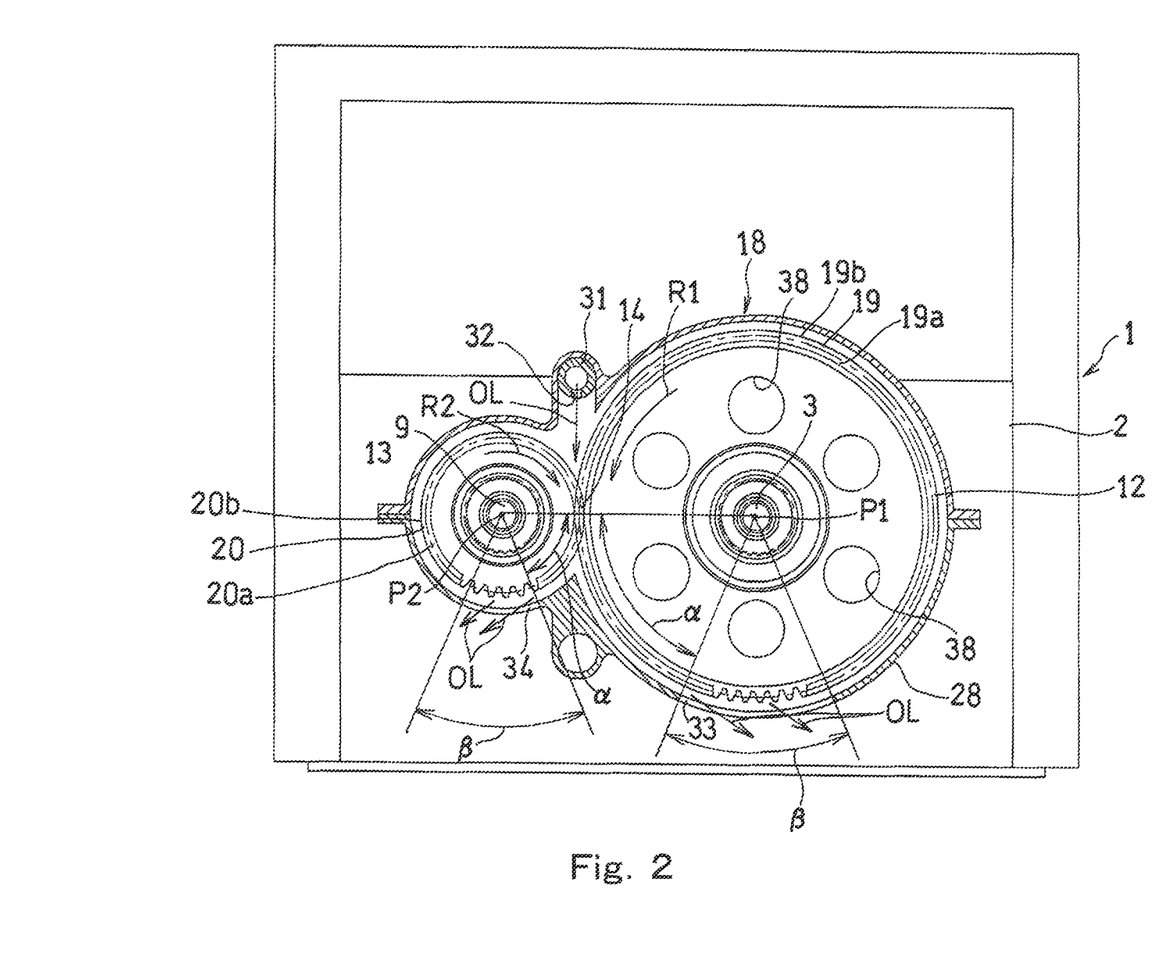
FIG. 2 is a longitudinal sectional view of the gear system.

As shown in FIG. 2, the input gear 12 and the output gear 13 are disposed such that their respective central axes P1 and P2 are parallel to each other on the same horizontal plane, and also, a meshing position 14 at which the gears 12 and 13 mesh with each other is on the plane. The input gear 12 rotates in a rotation direction R1 (the counterclockwise direction in FIG. 2), and the output gear 13 rotates in a rotation direction R2 (the clockwise direction in FIG. 2). That is, the gears 12 and 13 mesh with each other at the meshing position 14 while moving downward. Accordingly, the gears 12 and 13 act like a gear pump having its suction side above the meshing position 14.

Figure 3:
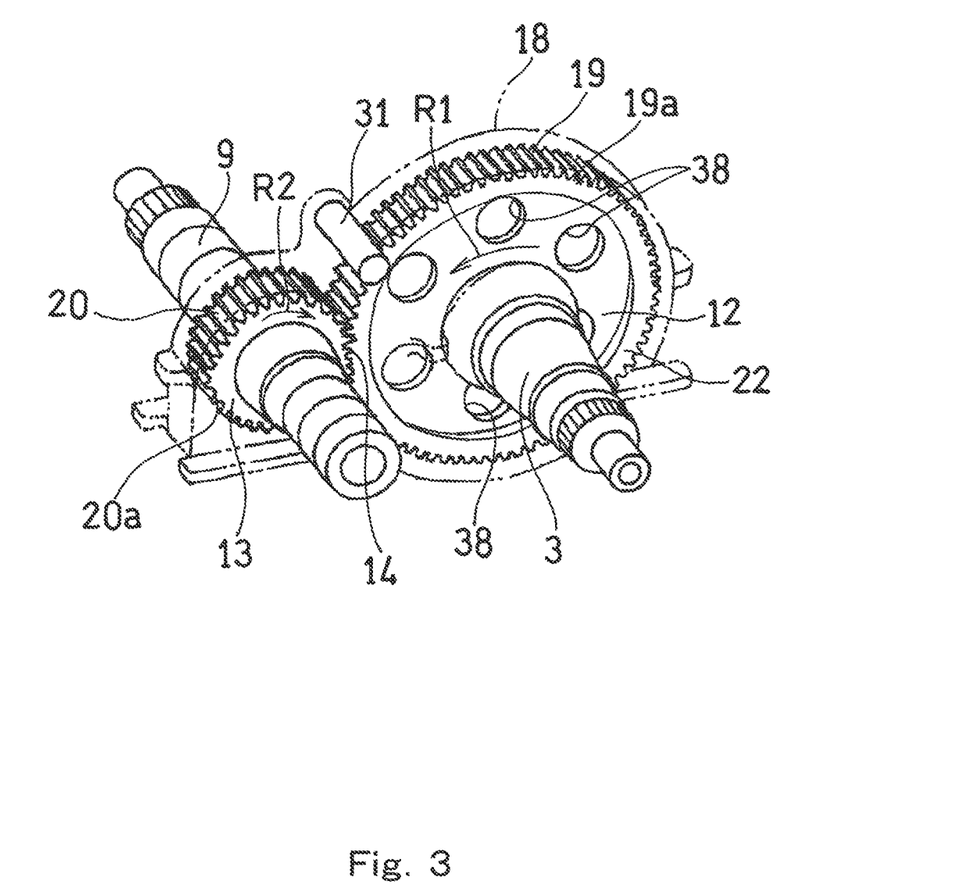
FIG. 3 is a perspective view showing the gear train of the gear system.
Figure 4:
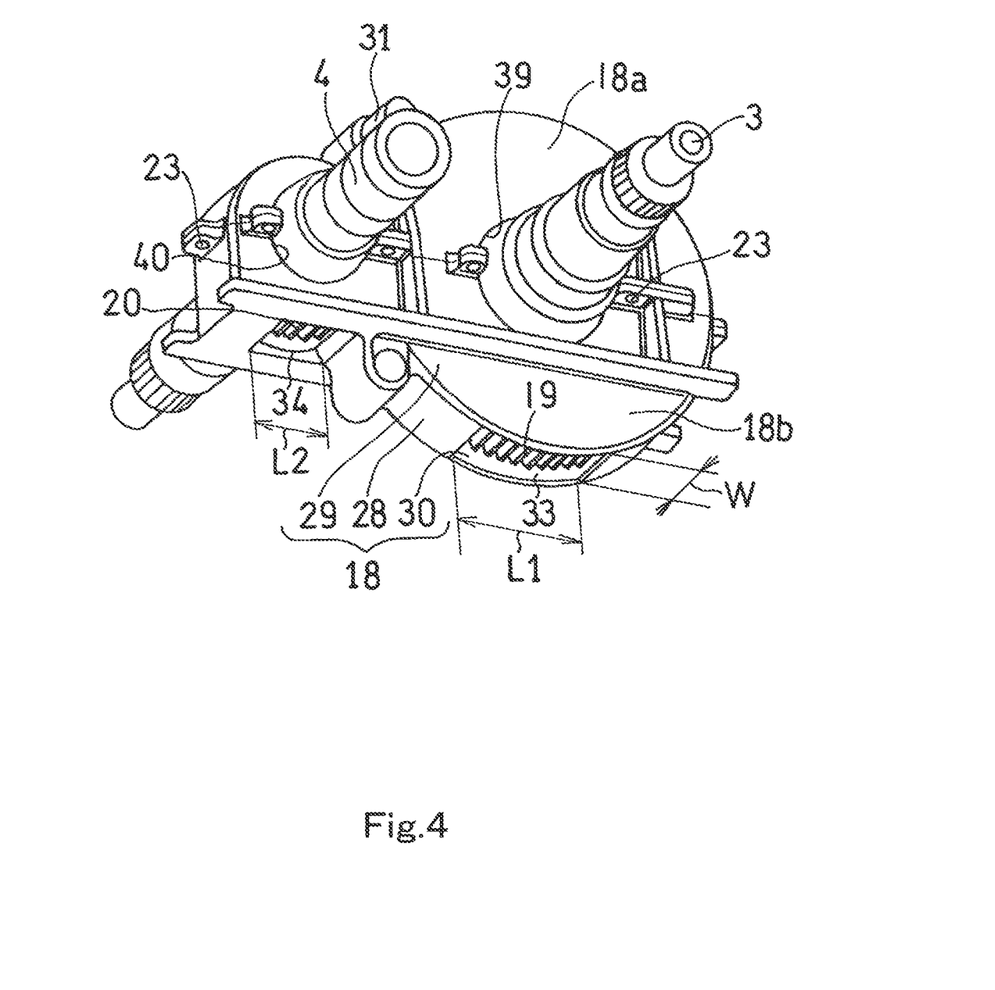
FIG. 4 is a perspective view of the lubricating device as seen from below.
Figure 5:
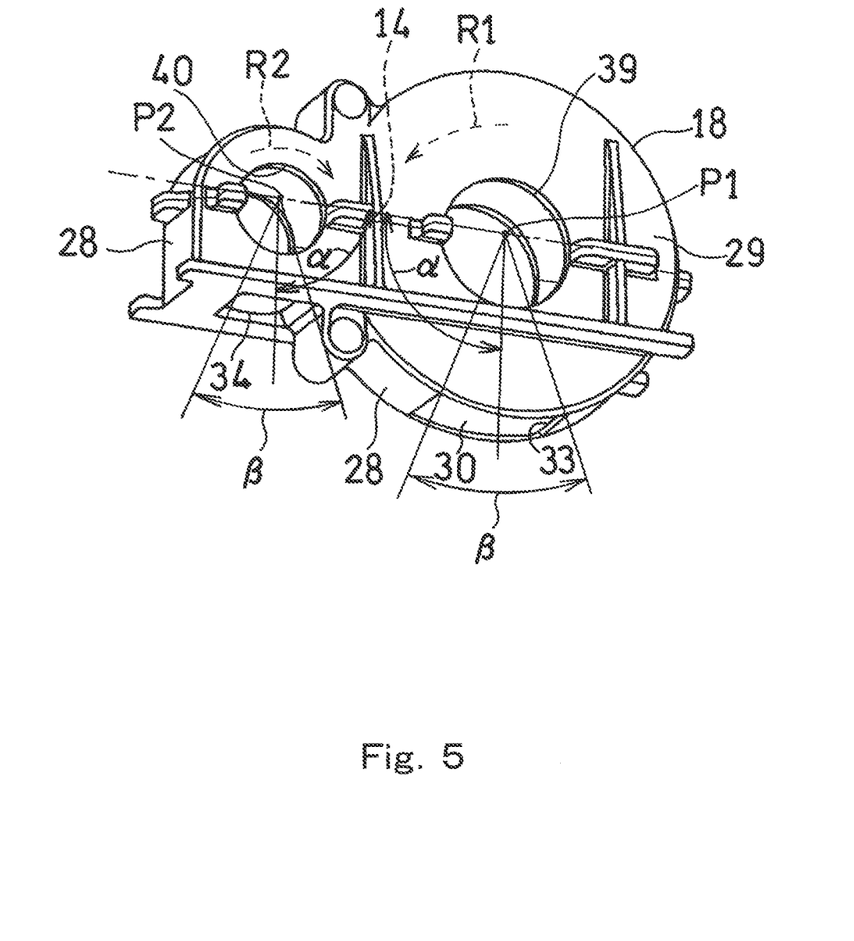
FIG. 5 is a perspective view of a shroud of the lubricating device as seen from below.

As shown in FIG. 1, the gears 12 and 13 are covered by a shroud 18. The shroud 18 is attached to the bearing housing 2 by multiple bolts. In FIG. 3, the shroud 18 is indicated by a two-dot chain line. As shown in FIG. 3, the shroud 18 covers a large part of the side faces of the gears 12 and 13, and also covers the teeth 19 and 20 in their entirety. As shown in FIGS. 1 and 2, the shroud 18 is mainly formed of: an outer peripheral wall 28 positioned radially outward from the gears 12 and 13; and side walls 29 and 30 positioned at both sides, respectively, of each of the gears 12 and 13. As shown in FIG. 4, the shroud 18 is formed by combining an upper half body 18a and a lower half body 18b. The upper half body 18a and the lower half body 18b are fixed to each other by bolts (not shown) that are screwed through insertion holes 23 formed in both the upper half body 18a and the lower half body 18b. As shown in FIG. 5, through-holes 39 and 40 are formed in each of the side walls 29 and 30. The through-holes 39 and the through-holes 40 allow the input shaft 3 and the output shaft 9, respectively, to penetrate through the side walls 29 and 30.

As shown in FIG. 3, the shroud 18 is provided with a nozzle 31 for use in supplying lubricating oil OL. The nozzle 31 extends in parallel to the input shaft 3 and the output shaft 9, and penetrates the shroud 18. As shown in FIG. 2, the nozzle 31 has a supply port 32 formed therein, through which the lubricating oil OL is supplied. The supply port 32 is positioned above the meshing position 14 of the gears 12 and 13 (i.e., away from the meshing position 14 in a direction opposite to the rotation directions R1 and R2 of the teeth 19 and 20), and is open in the vertically downward direction. Accordingly, the nozzle 31 positioned above the meshing position 14 can supply the lubricating oil OL downward to the meshing position 14. In other words, the direction in which the lubricating oil OL is supplied from the nozzle 31 to the meshing position 14 is perpendicular to the plane that includes the meshing position 14 and the central axes P1 and P2 of the gears 12 and 13. It should be noted that the nozzle 31 is supplied with the lubricating oil OL from a lubricating oil pump which is not shown.

As shown in FIG. 5, a first outlet port 33 and a second outlet port 34, through which the lubricating oil OL is discharged, are formed in the outer peripheral wall 28 of the shroud 18. The outlet ports 33 and 34 are formed such that their angular positions are 90° forward from the meshing position 14 in the rotation directions R1 and R2 of the gears 12 and 13, respectively. Here, the angular positions of the outlet ports 33 and 34 are determined with reference to the centers of the respective outlet ports 33 and 34 in a circumferential direction. That is, in the above case, if imaginary lines are drawn from the central axis P1 (or P2) to the meshing position 14 and to the center of the outlet port 33 (or 34) in the circumferential direction, then the angle formed by these imaginary lines is 90° (hereinafter, this angle is referred to as a "positioning angle $\alpha$"). It should be noted that, as described below, the positioning angle $\alpha$ is preferably 90°±15°.

Each of the outlet ports 33 and 34 has an angular width of 45° with respect to the corresponding central axis P1 (or P2). That is, if imaginary lines are drawn from the central axis P1 (or P2) to both edges of the outlet port 33 (or 34) in the circumferential direction, then the angle formed by these imaginary lines is 45° (hereinafter, this angle is referred to as a "width angle $\beta$"). It should be noted that, as described below, the width angle $\beta$ is preferably 45°±7°. The outlet ports 33 and 34 are formed over the entire width of the outer peripheral wall 28 in the direction of the central axes P1 and P2. That is, the width W of the outlet ports 33 and 34 (see FIG. 4) in the direction of the central axes P1 and P2 is equal to the width of the outer peripheral wall 28 (i.e., equal to the distance between the inner face of the side wall 29 and the inner face of the side wall 30).

Figure 6:
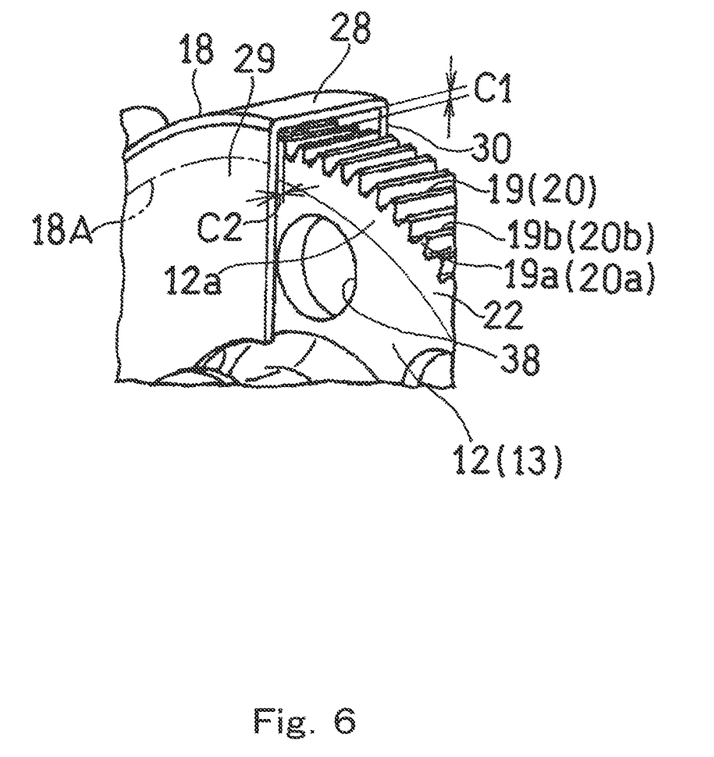
FIG. 6 is a partially cutaway perspective view of the lubricating device.

As shown in FIG. 6, a gap C1 between the outer peripheral wall 28 and tooth tips 19b of the input gear 12 (as well as a gap C1 between the outer peripheral wall 28 and tooth tips of the output gear 13) is set to 5 mm. As described below, the gap C1 is preferably 5±1 mm. However, this value of the gap C1 is suitable under the following conditions: the pitch circle diameter of the input gear 12 is 40 to 500 mm; the pitch circle diameter of the output gear 13 is 90 to 110 mm; the face width of the gears 12 and 13 is 6 to 60 mm; the depth of the gears 12 and 13 is 5 mm±2 mm; and the gears 12 and 13 of the gear train rotate with a peripheral speed of 50 to 120 m/sec. Among these conditions, the depth has a major influence in determining the gap C1. That is, in a case where the gap C1 is determined with reference to the depth, it is desired that the gap C1 is 0.5 to 1.5 times greater than the depth.

A gap C2 between each of the side walls 29 and 30 and a corresponding one of side faces 12a of the input gear 12 (i.e., a corresponding one of side faces 19a of the teeth 19) is set to 5 mm (similarly, a gap C2 between each of the side walls 29 and 30 and a corresponding one of side faces of the output gear 13 (i.e., a corresponding one of side faces 20a of the teeth 20) is set to 5 mm). As described below, the gap C2 is preferably 5±1 mm. It should be noted that, unlike the gap C1, the gap C2 is hardly affected by the dimensions and rotational speed of the gears. One desirable example of the gap C2 is 5±1 mm regardless of the diameter of the input gear.

Described next are functions of a lubricating device for the gear train including the gears 12 and 13. The lubricating oil OL is jetted out downward from the supply port 32 of the nozzle 31 shown in FIG. 2, and the lubricating oil OL that is jetted out is supplied to the meshing position 14 of the gears 12 and 13. As a result, the gears 12 and 13 are lubricated. The lubricating oil OL supplied to the meshing position 14 flows downward through the meshing position 14. Thereafter, the lubricating oil OL is, while being guided by the shroud 18, divided into two streams in the rotation direction R1 of the input gear 12 and the rotation direction R2 of the output gear 13, and the two streams of the lubricating oil OL are guided to the lower parts of the input gear 12 and the output gear 13, respectively. Eventually, the lubricating oil OL is discharged to the outside of the shroud 18 through the first outlet port 33 and the second outlet port 34.

Here, assume a case where the gears 12 and 13 act as a gear pump. In this case, since the lubricating oil supply port 32 is disposed at the suction side of the gear pump, even if the discharge pressure of the lubricating oil OL from the lubricating oil supply port 32 is low, a large amount of lubricating oil OL can be efficiently supplied to the meshing position 14 from the supply port 32, and the meshing position 14 can be lubricated sufficiently.

As mentioned above, it is desired that the gap C1 in relation to each of the tooth tips 19b and 20b of the gears 12 and 13 is 5 mm±1 mm or 0.5 to 1.5 times greater than the depth of the gears 12 and 13. Such a structure makes it possible to suppress the agitation resistance and flow resistance of the lubricating oil OL. Specifically, if the gap C1 is greater than the aforementioned value, then the amount of lubricating oil OL that remains between the outer peripheral wall 28 and the tooth tips 19b and 20b increases. As a result, the lubricating oil OL flows through a narrow passage in the shroud 18, causing an increase in agitation resistance. On the other hand, if the gap C1 is less than the aforementioned value, then the flow resistance of the lubricating oil OL between the outer peripheral wall 28 and the gears 12 and 13 increases.

Moreover, as mentioned above, it is desired that the gap C2 between each of the side faces of the gears 12 and 13 (in the case of the input gear 12, each of the side faces of the rim 22) and the corresponding one of the side walls 29 and 30 of the shroud 18 is 5 mm±1 mm. Such a structure makes it possible to suppress generation of air flows swirling around the central axes P1 and P2, which tend to be generated when air is dragged by the side faces of the gears 12 and 13. Consequently, air resistance exerted on the gears 12 and 13 can be reduced. Meanwhile, if the gap C2 is greater than the aforementioned value, such an advantageous effect is reduced and the amount of lubricating oil OL that remains within the shroud is increased. On the other hand, if the gap C2 is less than the aforementioned value, the lubricating oil OL becomes more likely to adhere to the side faces of the gears 12 and 13, causing an increase in rotational resistance. In particular, at the input gear 12, which has lightening holes 38 for weight reduction, it becomes less easy for the lubricating oil OL to pass through the lightening holes 38, resulting in increased agitation resistance of the lubricating oil OL.

As mentioned above, it is desired that the positioning angle α is 90°±15°. The reason for this is as follows. Swirl flows of the lubricating oil OL in the rotation directions R1 and R2 of the gears 12 and 13 shown in FIG. 2 are gradually rectified while advancing from the meshing position 14 in the rotation directions R1 and R2. Then, at angular positions that are 90°±15° forward from the meshing position 14 in the rotation directions R1 and R2 of the gears 12 and 13, the swirl flows of the lubricating oil OL within the shroud 18 become sufficiently smooth. In addition, at these angular positions, the flow rate of the lubricating oil OL is great, and therefore, great centrifugal force is exerted on the lubricating oil OL. Thus, if the first outlet port 33 and the second outlet port 34 are formed such that the positioning angle α is 90°±15°, then the area of opening of these outlet ports can be made small, so that air resistance due to air flowing in through the outlet ports 33 and 34 is suppressed, and yet the lubricating oil OL can be suitably discharged through the outlet ports 33 and 34 at a preset discharge amount. Therefore, according to the above structure, the air resistance and the lubricating oil agitation resistance can be advantageously reduced.

Meanwhile, if the positioning angle α is less than the aforementioned value (i.e., the positioning angle α is less than 75°), then the lubricating oil OL, after having passed through the meshing position 14, is not yet rectified sufficiently, and therefore, the lubricating oil OL is not discharged smoothly. On the other hand, if the positioning angle α is greater than the aforementioned value (i.e., the positioning angle α is greater than 105°), then a time during which the lubricating oil OL remains within the shroud 18 becomes long, which results in an increase in lubricating oil agitation resistance occurring when the gears 12 and 13 agitate the remaining lubricating oil OL, and power loss increases, accordingly.

As mentioned above, it is desired that the width angle β is 45°±7°. Such a structure makes it possible to efficiently discharge a suitable amount of lubricating oil OL, thereby reducing power loss. Specifically, if the width angle β is less than the aforementioned value (i.e., the width angle β is less than 38°), then the lubricating oil OL is discharged by an amount less than the preset value. As a result, an excessive amount of lubricating oil OL remains at the bottom of the shroud 18. On the other hand, if the width angle β is greater than the aforementioned value (i.e., the width angle β is greater than 52°), then the area of opening of the outlet ports 33 and 34 becomes too large, which increases a possibility that air, oil droplets, and the like will flow in from the outside. As a result, the reduction of power loss is hindered.

In the present embodiment, the width W of the outlet ports 33 and 34 in the direction of the central axes P1 and P2 is set to be equal to the width of the outer peripheral wall 28 (i.e., equal to the distance between the inner face of the side wall 29 and the inner face of the side wall 30). Accordingly, the lubricating oil OL within the shroud 18 receives centrifugal force occurring from the rotation of the gears 12 and 13, and is guided mainly by the outer peripheral wall 28 of the shroud 18. Thereafter, almost all of the lubricating oil OL is efficiently discharged through the outlet ports 33 and 34. Thus, a possibility that the lubricating oil OL remains within the shroud 18 is reduced.

Figure 7:
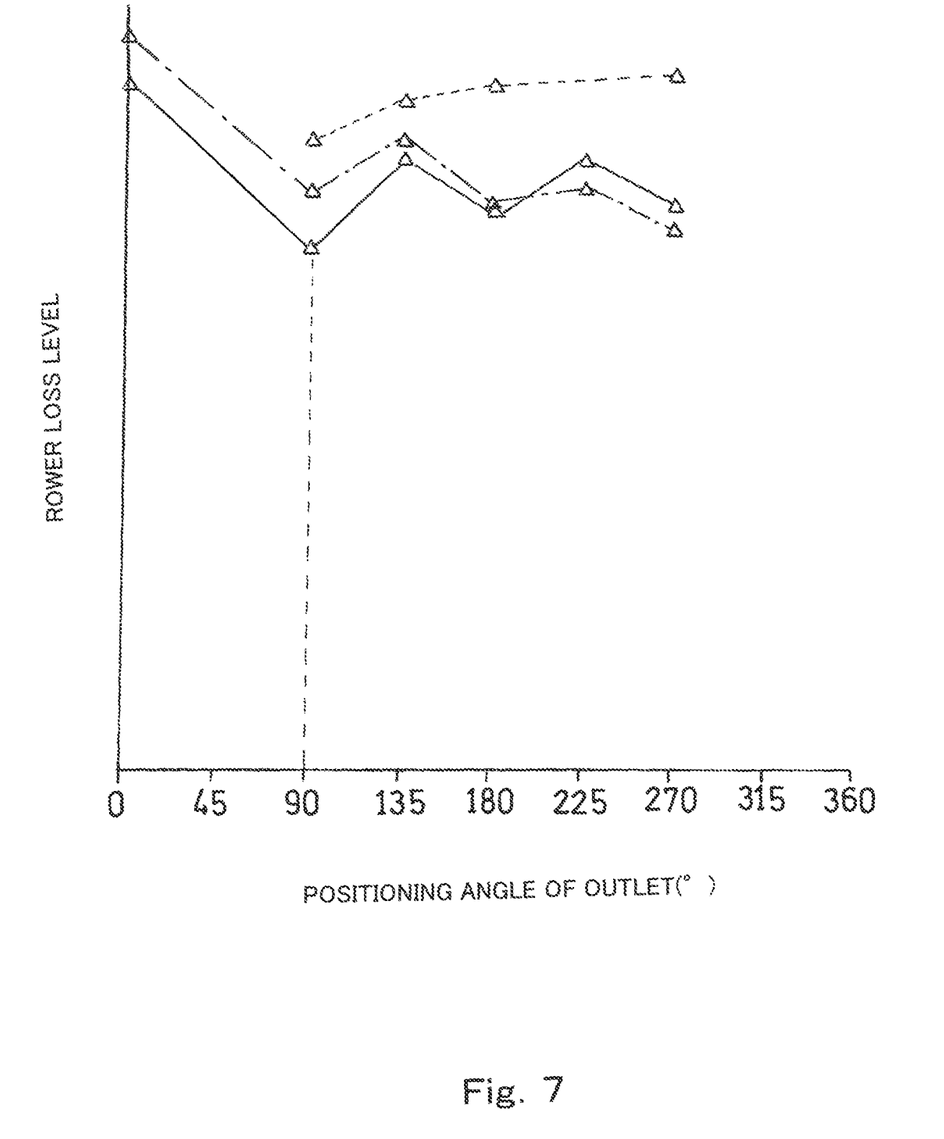
FIG. 7 shows experiment results indicating relationships between positioning angles of an outlet port and power loss.

FIG. 7 shows experiment results indicating power losses in relation to the positioning angle α. A solid broken line represents experiment results in a case where the width angle β is 45°, and a dashed-dotted broken line represents experiment results in a case where the width angle β is 30°. In both cases, the gaps C1 and C2 (see FIG. 6) are set to 5 mm. A dashed broken line represents experiment results in a case where the width angle β is 45°, and the gaps C1 and C2 are both set to 3 mm.

As is clear from FIG. 7, it has been confirmed that the power loss level is minimized when the positioning angle α is set to 90°, the width angle β is set to 45°, and the gaps C1 and C2 are set to 5 mm. Sufficient power loss reduction is achieved when the positioning angle α is 90°±15°, the width angle β is 45°±7°, the gap C1 between the shroud 18 and each of the tooth tips 19b and 20b of the gears 12 and 13 is 5±1 mm, and the gap C2 between the shroud 18 and each of the side faces 12a and 13b of the gears 12 and 13 is 5±1 mm.

In the above-described embodiment, the shroud 18 covers a large part of the side faces of the gears 12 and 13, and also covers the teeth 19 and 20 as shown in FIGS. 3 and 4. However, as indicated by a two-dot chain line shown in FIG. 6, a shroud 18A may only cover: an outer peripheral face which includes imaginary cylindrical faces formed by the continuously arranged tooth tips 19b and 20b of the teeth 19 and 20; and the side faces 19a and 20a. This structure also allows the lubricating oil OL to be smoothly discharged through the outlet ports 33 and 34 (see FIG. 2). In this case, the gap C2 between the side wall 29 and each of the side faces 19a and 20b opposed thereto of the teeth 19 and 20 is set to 5 mm, and also, the gap C2 between the side wall 30 and each of the side faces 19a and 20b opposed thereto of the teeth 19 and 20 is set to 5 mm.

It should be noted that even if the lubricating oil OL is supplied to the meshing position 14 from downward unlike in the above-described embodiment, the above-described advantage of efficiently discharging the lubricating oil OL can be obtained. Moreover, even if the rotation directions R1 and R2 of the gears 12 and 13 are reversed from the rotational directions indicated in the above embodiment, and the nozzle 31 is disposed at the same position as in the above embodiment, the above-described advantage of efficiently discharging the lubricating oil OL can be obtained.

The present invention is not limited to the above-described embodiment. Various additions, deletions, and modifications may be made to the above embodiment without departing from the spirit of the present invention. Therefore, such additions, deletions, and modifications also fall within the scope of the present invention.

REFERENCE CHARACTERS LIST 12 input gear (gear)
12a gear's side face
13 output gear (gear)
13a side face
14 meshing position
18 shroud
19, 20 teeth
19a, 20a side face of teeth
28 outer peripheral wall
29, 30 side wall
32 lubricating oil supply port
33 first outlet port (outlet port)
34 second outlet port (outlet port)
OL lubricating oil
P1, P2 central axis
R1, R2 gear rotation direction
L1, L2 length in a gear circumferential direction
β width angle
C1, C2 gap

The invention claimed is:

1. A gear train lubricating device configured to supply lubricating oil to a gear included in a gear train, the gear train lubricating device comprising:
   a shroud covering, among components constituting the gear, at least teeth of the gear; and
   a lubricating oil supply port through which the lubricating oil is supplied to a meshing position of the gear, wherein
   the shroud has an outlet port formed therein, through which the supplied lubricating oil is discharged,
   the outlet port is formed in a portion of the shroud that is positioned radially outward from the gear, such that the outlet port is disposed at an angular position that is $90°\pm15°$ forward from the meshing position in a rotation direction of the gear, and
   the outlet port has an angular width of $45°\pm7°$ with respect to a central axis of the gear.

2. The gear train lubricating device according to claim 1, wherein
   the shroud includes:
       an outer peripheral wall covering the gear from radially outward; and
       side walls connected to both side edges, respectively, of the outer peripheral wall and covering side faces of the teeth.

3. The gear train lubricating device according to claim 2, wherein
   the outlet port has a width in a direction of the central axis, the width being substantially equal to an internal gap between the side walls.

4. The gear train lubricating device according to claim 2, wherein a gap between the outer peripheral wall of the shroud and tooth tips of the teeth is 0.5 to 1.5 times greater than a depth of the teeth.

5. The gear train lubricating device according to claim 2, wherein
   a gap between each of the side walls and a side face opposed thereto of the teeth is $5\pm1$ mm.

6. The gear train lubricating device according to claim 1, wherein
   the lubricating oil supply port is positioned away from the meshing position in a direction opposite to the rotation direction of the gear, and is configured to supply the lubricating oil to the meshing position.

7. The gear train lubricating device according to claim 1, wherein
   a peripheral speed at a pitch circle of the gear is 50 to 120 msec.

* * * * *

UNITED STATES PATENT AND TRADEMARK OFFICE
CERTIFICATE OF CORRECTION

PATENT NO. : 8,991,557 B2  
APPLICATION NO. : 13/578570  
DATED : March 31, 2015  
INVENTOR(S) : Hidenori Arisawa et al.

It is certified that error appears in the above-identified patent and that said Letters Patent is hereby corrected as shown below:

In the Claims

Claim 7, Column 10, line 42, delete "msec" and insert --m/sec--.

Signed and Sealed this
Eighteenth Day of August, 2015

Michelle K. Lee
*Director of the United States Patent and Trademark Office*